US012365974B2

(12) United States Patent
Heitkamp et al.

(10) Patent No.: US 12,365,974 B2
(45) Date of Patent: Jul. 22, 2025

(54) PRODUCTION OF A DESIRED METAL WORKPIECE FROM A FLAT METAL PRODUCT

(71) Applicant: ThyssenKrupp Steel Europe AG, Duisburg (DE)

(72) Inventors: Ansgar Heitkamp, Krefeld (DE); Tobias Ridder, Recklinghausen (DE); Christian Odenhausen, Wesel (DE); Daniel Overloper, Duisburg (DE); Robin Hayn, Duisburg (DE)

(73) Assignee: Thyssenkrupp Steel Europe AG, Duisburg (DE)

( * ) Notice: Subject to any disclaimer, the term of this patent is extended or adjusted under 35 U.S.C. 154(b) by 76 days.

(21) Appl. No.: 17/768,609

(22) PCT Filed: Nov. 26, 2020

(86) PCT No.: PCT/EP2020/083523
§ 371 (c)(1),
(2) Date: Apr. 13, 2022

(87) PCT Pub. No.: WO2021/105292
PCT Pub. Date: Jun. 3, 2021

(65) Prior Publication Data
US 2024/0100643 A1    Mar. 28, 2024

(30) Foreign Application Priority Data
Nov. 26, 2019   (DE) .................. 10 2019 132 029.1

(51) Int. Cl.
*C23C 2/02*   (2006.01)
*B21B 37/46*   (2006.01)
(Continued)

(52) U.S. Cl.
CPC .............. *C23C 2/024* (2022.08); *B23P 13/02* (2013.01); *B23P 17/04* (2013.01); *B23P 23/06* (2013.01);
(Continued)

(58) Field of Classification Search
None
See application file for complete search history.

(56) References Cited

U.S. PATENT DOCUMENTS 5,727,127 A * 3/1998 Schulze Horn ........ B22D 11/16
706/47
6,164,103 A * 12/2000 Pichler .................... B21B 37/40
72/247

(Continued)

FOREIGN PATENT DOCUMENTS

| CN | 1589184 A | 3/2005 |
|---|---|---|
| CN | 109074047 A | 12/2018 |

(Continued)

OTHER PUBLICATIONS

Office Action for European Application No. 20 815 788.3 dated Mar. 22, 2023 and English translation.

(Continued)

*Primary Examiner* — David Earl Ogg
(74) *Attorney, Agent, or Firm* — Harness, Dickey & Pierce, P.L.C.

(57) ABSTRACT

The method includes providing a computer model for producing the desired metal workpiece from the flat metal product in a processing procedure, the processing procedure including processing step on the flat metal product by a processing device, receiving technical data record characterizing the flat metal product, at least part of the data of the technical data record having been recorded during the production of the flat metal product, passing the technical data (Continued)

Figure 1:
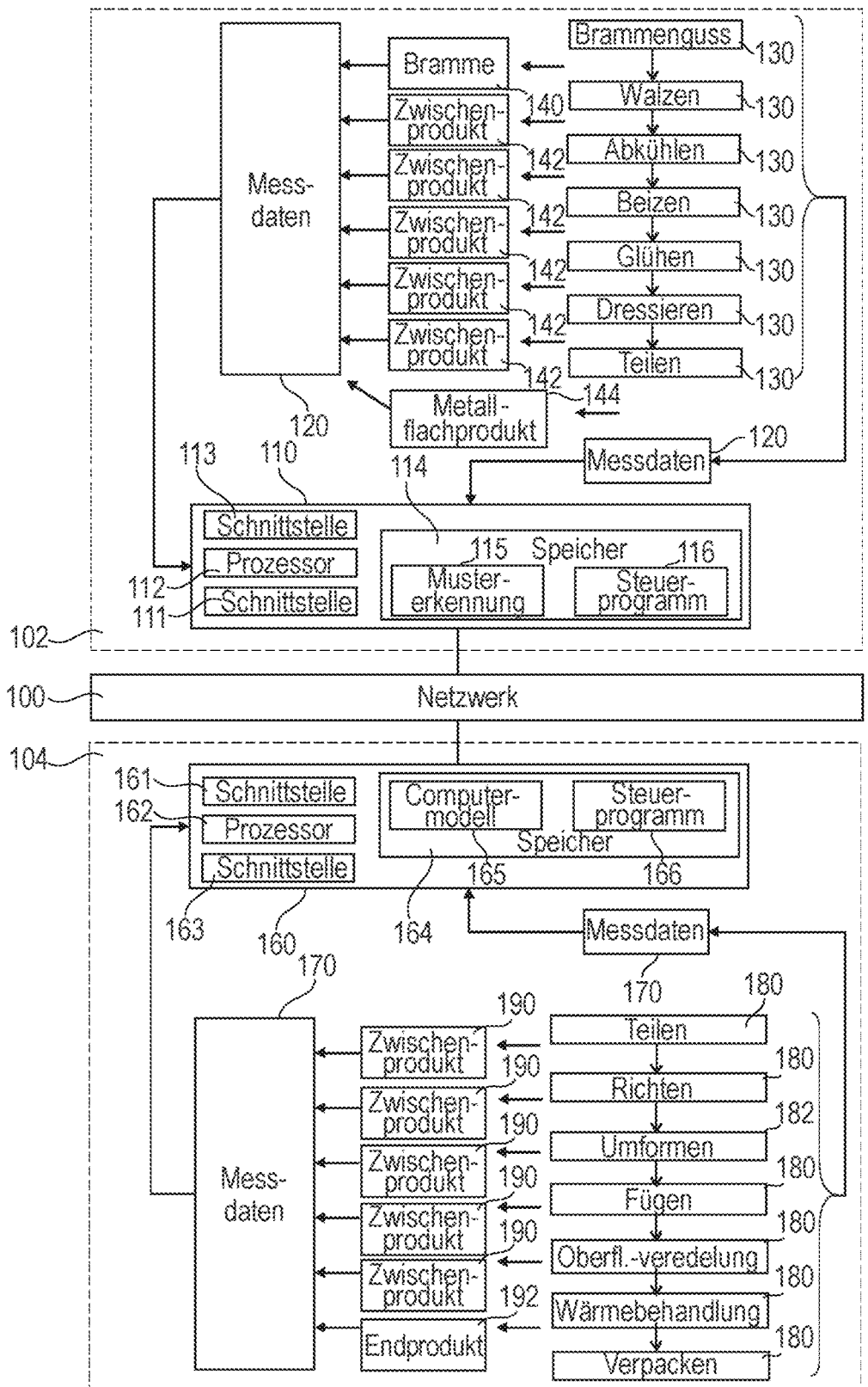

record to the input of the computer model, based on the passing of the technical data record, receiving a model value for an operating parameter of the processing device from the output of the computer model, producing the desired metal workpiece by controlling the processing procedure, the control of the processing procedure including a controlling of the processing device to perform the processing step on the flat metal product using the operating parameter set to the model value.

20 Claims, 2 Drawing Sheets

(51) Int. Cl.
    *B23P 13/02*     (2006.01)
    *B23P 17/04*     (2006.01)
    *B23P 23/06*     (2006.01)
    *B23Q 41/08*     (2006.01)
    *C23C 2/00*     (2006.01)

(52) U.S. Cl.
    CPC .............. *B23Q 41/08* (2013.01); *C23C 2/022* (2022.08); *C23C 2/51* (2022.08); *B21B 37/46* (2013.01)

(56) References Cited

U.S. PATENT DOCUMENTS

| | | | | |
|---|---|---|---|---|
| 6,807,449 | B1* | 10/2004 | Schlang | G05B 13/027 700/48 |
| 2004/0205951 | A1* | 10/2004 | Kurz | B21B 37/74 29/407.05 |
| 2008/0135203 | A1* | 6/2008 | Doll | B22D 11/16 164/157 |
| 2010/0100218 | A1 | 4/2010 | Weinzierl et al. | |
| 2011/0213486 | A1* | 9/2011 | Plociennik | B22D 11/16 700/103 |
| 2014/0129023 | A1* | 5/2014 | Dagner | G05B 15/02 700/148 |
| 2014/0200696 | A1* | 7/2014 | Batrin | G05B 19/41865 700/95 |

FOREIGN PATENT DOCUMENTS

| | | |
|---|---|---|
| DE | 198 34 422 A1 | 2/2000 |
| DE | 10156008 A1 | 6/2003 |
| DE | 103 06 273 A1 | 9/2004 |
| DE | 10 2010 032 185 A1 | 1/2012 |
| DE | 102018206083 A1 * | 10/2019 |
| EP | 2431105 A1 | 3/2012 |
| EP | 2527053 A1 | 11/2012 |
| EP | 2540404 A1 | 1/2013 |
| EP | 3479916 A1 | 5/2019 |
| EP | 3542915 A1 | 9/2019 |
| WO | WO-2004080628 A1 | 9/2004 |

OTHER PUBLICATIONS

Office Action dated Mar. 7, 2020 issued in corresponding Germany Priority Application No. 10 2019 132 029.1.
W. Drossel et al. 'Das Presswerk auf dem Weg ins das Cyberphysische Zeitalter' *Industrielle Fertigung*, vol. 111, 2016, H. 7-8, pp. 460-465.
International Preliminary Report on Patentability and Written Opinion for PCT/EP2020/083523, dated Jun. 9, 2022.
International Search Report and Written Opinion for International Application No. PCT/EP2020/083523 dated Feb. 5, 2021.
Office Action for Chinese Application No. 202080066042.9 dated Jun. 12, 2024 and English translation.
Office Action issued Jan. 17, 2025 in Chinese Application No. 202080066042.9.

* cited by examiner

PRODUCTION OF A DESIRED METAL WORKPIECE FROM A FLAT METAL PRODUCT

CROSS-REFERENCE TO RELATED APPLICATIONS

This application is a national phase under 35 U.S.C. § 371 of PCT International Application No. PCT/EP2020/083523 which has an International filing date of Nov. 26, 2020, which claims priority to German Patent Application No. 102019132029.1, filed Nov. 26, 2019, the entire contents of each of which are hereby incorporated by reference.

The invention relates to the control of production facilities for metal products, in particular those for flat metal products (for example, sheets, strips) and their further processing into metal workpieces.

Slabs made of different materials such as steel, copper alloys or aluminum are produced, for example, in continuous casting plants and then further processed in a metalworking company, for example, a press or rolling mill. Typically, the further processing takes place in a plurality of stages, for example, on the one hand, in a hot rolling mill and then in a cold rolling mill. The hot rolling mill uses the method of heating the slabs to a temperature above the recrystallization temperature and reducing said slabs to a specified thickness in the rolling gap of a hot rolling mill by means of pressure. Since the volume of the slab remains the same, there are corresponding changes in length and width. Due to the hot rolling process, a slab ultimately results in a strip, for example, which is wound up on a reel to form what is known as a coil.

The rolling can be carried out in different ways, in particular in a plurality of stages. When it comes to hot rolling, either the continuously cast slab is (re)heated to a predefined temperature above the recrystallization temperature or the cast strand coming from the casting heat is kept at a predefined temperature above the recrystallization temperature during casting rolling or reheated and hot-rolled to a predefined thickness, for example, to obtain the coil.

The hot-rolled strip (hot strip) can be further processed in further process steps, for example, pickled, annealed, split, cold-rolled and/or coated. If the hot-rolled strip is cold-rolled to form a cold strip, for example, the thickness of the strip is further reduced and the desired properties are set in the cold strip. If the hot-rolled strip or cold-rolled strip is split, a wide strip is split longitudinally into a plurality of narrow strips (slit strips). If the hot-rolled or cold-rolled strip or slit strip is coated, the strip is coated with a non-metallic or metallic coating, in particular with a metallic anti-corrosion coating, which can be applied, for example, in a hot-dip coating system or alternatively in an electrolytic coating system.

The production of a hot-rolled strip or cold-rolled strip or a resulting slit strip, which can be pickled, annealed and/or coated, is usually implemented by a producer, in the case of steel strip by a steel producer, which strip is made available to the processing industry (processors) as a flat metal product. The processor usually carries out an incoming inspection when a flat metal product is received. Picking takes place on this basis, among other things, for further processing. This process causes effort, a time delay and possibly a loss of quality on the part of the processor.

The invention is therefore based on the object of providing an improved method for producing a desired metal workpiece from a flat metal product, a corresponding control device, a method for controlling a production facility of a metalworking company, a corresponding control device and a computer program product that implements the method or methods. The objects on which the invention is based are achieved by the features of the independent patent claims. Embodiments of the invention are specified in the dependent claims. The object is achieved by means of a computer-implemented method for producing a desired metal workpiece from a flat metal product having the features of claim 1. According to one aspect of the invention, the computer-implemented method for producing a desired metal workpiece from a flat metal product comprises the following steps:

providing a computer model for producing the desired metal workpiece from the flat metal product in a processing procedure, the computer model comprising an input and an output, the processing procedure comprising a processing step on the flat metal product by a processing means, receiving a technical data record characterizing the flat metal product, at least part of the data of the technical data record having been recorded during the production of the flat metal product, passing the technical data record to the input of the computer model, based on the passing of the technical data record, receiving a model value for an operating parameter of the processing means from the output of the computer model, producing the desired metal workpiece by controlling the processing procedure, the control of the processing procedure comprising a controlling of the processing means to perform the processing step on the flat metal product using the operating parameter set to the model value, the flat metal product being logically divided into a plurality of segments, the technical data record for each of the segments comprising technical data characterizing the segment.

One aspect of the method is based on the fact that the producer of a flat metal product has the relevant material and production data, which said processor, for example, either documents or must document internally for quality measures during the process, or which said processor uses for control purposes in the production of the flat metal product, or which is explicitly recorded for implementation of the method described above.

The method for producing a desired metal workpiece from a flat metal product provides the processor with a technical data record with which said processor could be able to view and thus analyze details of the flat metal product and/or its production. This could happen, for example, before the flat metal product is received and its throughput in the further processing means of the processor. Early provision of the technical data record could have the advantage that the incoming inspection of the flat metal product by the processor is reduced in scope or may only be carried out on a random basis, that is, not for every flat metal product received, or can even be omitted entirely. For example, an incoming inspection having a reduced scope could do without comparatively time-consuming manual inspections.

The technical data record could continue to serve as the basis for a plausibility check, in which data from the technical data record is compared with data from the incoming inspection, for example. In particular, the technical data record could contain data that are not accessible as part of an incoming inspection, such as specific physical or technical process parameters of production or an identifier of a specific production machine involved in the production of the flat metal product. In this way, the database of the plausibility check could be enlarged and the plausibility check could thus be simplified and/or shortened.

The technical data record could also make it easier to identify the flat metal product and thus reduce or eliminate the risk of material confusion. In this way, a more constant quality of the metal workpiece could be achieved and the risk of complaints could be reduced.

At least part of the data of the technical data record is passed as input to a computer model that numerically and/or analytically simulates the processing procedure of the flat metal product and the output of which has a model value for an operating parameter of a processing means that is to be used in the processing procedure of processing the flat metal product in a processing step. This could have the advantage that the processing step for which the model value was obtained can be carried out on the basis of the actual properties of the individual flat metal product, rather than on the basis of, for example, empirical, standard, target, blanket or average values. This can additionally or alternatively enable process optimization and/or an increase in efficiency. The risk of quality fluctuations in the metal workpiece could also be reduced.

Furthermore, on the basis of the technical data record and/or the model value, an optimized sequence in the further processing (chain) could be made possible, which is could have an advantageous effect, for example, in an increase in the utilization of the processing means, a reduction in the throughput times of the flat metal products through the processing plant (for example, by reducing the number of material changes per processing means) and/or a saving in the energy required to operate the processing means. The allocation of flat metal products as starting material for the production of certain metal workpieces could also be optimized on the basis of certain desired properties of the metal workpieces, which could also have an advantageous effect on the quality of the metal workpieces.

Some of the terms and matters used in this disclosure should be understood in accordance with the following definitions and clarifications. A flat metal product is understood here as a piece of semi-finished product made of a metal, a steel or a metal alloy, the geometry of which allows a nominal value to be assigned for a thickness, which nominal value is small compared to any other assignable overall nominal dimension (for example, width, length in, where applicable, fully unfolded or unrolled state). "Small compared to" means a difference by a factor of at least 10, preferably at least 100. The flat metal product can optionally contain a non-metallic component (for example, carbon dissolved in the steel or a plastic coating), the weight of the non-metallic component being small compared to the weight of the metallic component. The flat metal product preferably consists of a steel material. For example, the use of an aluminum material is also conceivable.

The present description relates to a flat metal product from which a desired metal workpiece is to be produced in a processing procedure. The processing procedure has a processing step or a chronological sequence of a plurality of processing steps. Each processing step involves a physical and/or chemical change to the flat metal product or an intermediate product resulting therefrom. Elementary changes made at the same time count as a single processing step in the sequence.

Examples of a processing step include heat treating, dividing, and/or forming, without limitation to the above. A heat treatment can specifically comprise setting special properties in the metal workpiece to be produced. A further processing means for the heat treatment can comprise an oven, for example, a continuous oven. If predefined properties, such as high strength/hardness, are to be set in the metal workpiece, the further processing means can also comprise a cooling device for targeted cooling of the warm metal workpiece or the warm flat metal product in addition to the oven. A division can be used in a targeted manner for transverse division, for example, into plates or sheets, and/or for longitudinal division, in particular likewise into plates or sheets or into slit strips, of the flat metal product. Forming includes a change in shape compared to the previous state and may comprise profiling, roll forming, folding, deep drawing, or the like.

If the processing procedure has exactly one processing step, then said processing step converts the flat metal product directly from the initial state into the desired metal workpiece. If the processing procedure has more than one processing step, each processing step in the sequence, apart from the last processing step in the sequence, converts the flat metal product into a different intermediate state and the last processing step in the sequence converts the flat metal product from its last intermediate state into the desired metal workpiece. The definition of the flat metal product thus extends from its initial state up to and including its last intermediate state and only after the completion of the last processing step is the metal workpiece provided in place of the flat metal product.

By transferring the technical data record, which has data characterizing the flat metal product recorded during production and using said data record to determine a value (the model value) for an operating parameter of a processing step of the processing procedure that converts the flat metal product into the metal workpiece, the processing procedure can be influenced by details of the production of the flat metal product. The production of the flat metal product comprises all treatment and processing steps on the material or materials of the flat metal product between the completion of the chemical preparation of these materials (for example, setting the chemical composition of the melt in the blast furnace) and the initial state of the flat metal product. The initial state is characterized by a thermodynamic, chemical and mechanical equilibrium of the flat metal product with its environment in the absence of technical means, with the exception of storage and transport devices. In addition, the production of the flat metal product is not considered to be complete here until the technical data record has been received in full by the processor and is freely available for said processor's spontaneous access.

Without restricting the generality, the technical data record can, for example, have measurement data recorded during the production of the flat metal product, that is, during the performance of a production step (for example, casting, pickling, dividing) and/or after a production step on a resulting intermediate product. The technical data record can also contain data calculated from measurement data measured, for example, during the production of the flat metal product. The technical data record can also have, for example, a parameter value that was set during production for a production device involved in the production of the flat metal product. For example, static information, such as a machine identifier of a production device involved in the production of the flat metal product, and/or dynamic information, such as a time stamp or an identifier for an employee supervising the production of the flat metal product, can be added to the technical data record. Such added information could be stored, for example, in a memory of a control device controlling the production facility for producing the flat metal product.

In any case, analogous to the definition of the production of the flat metal product, the creation of the technical data record is to be considered complete when the processor has received the complete technical data record and can access said data record spontaneously. This means that the data of the technical data record can be stored before it is received by the processor but cannot be read or cannot be read in full by the processor. The technical data record only becomes accessible to the processor once the specified data has been received. This distinguishes the technical data record from further data which are measured on the finished flat metal product, for example, but are either not transmitted to the processor (internal data from the producer) or which (for example, as part of an incoming inspection) are available to the processor immediately after they have been recorded without prior storage, or which are publicly freely readable in any saved state. As such, the step of (physically) receiving the technical record may also be implemented as a release of a controlled access storage space such that the processor can physically receive the technical record at an arbitrary time after release. This also includes a permanent release of a storage space allocation (for example, a network folder) to which the processor has privileged but temporally random access and which is therefore different from public data. The receipt of the technical data record is therefore specific to the receiving processor.

The data types, codes or categories of the technical data record can be agreed between the producer of the flat metal product and the further processor. This can include, for example, an identification of the information requirements, for example, for an optimized breakdown of the flat metal product into sub-segments and their individual further processing. This requires the differentiated consideration of the entire strip in dynamically definable segments when the data is provided. Furthermore, it may be necessary to formulate special requirements for the recording of data on production facilities on the part of the supplier. The provision of the technical data record can make it necessary for the producer to extend the plausibility check and validation of the recorded data according to the requirements of the processing company. The data of the technical data record can be provided in a prepared form with regard to the needs of the processing company, for example, in the form of content interpretations such as a use case test or through specific information representation forms such as traffic light logic, concrete values, diagrams, etc. The form of provision of the data (for example, fully automated, on demand, case-by-case) can also be agreed between producer and further processor.

Analogously to the technical data record and without restricting generality, the processing data record can, for example, have measurement data that were recorded during the processing of the flat metal product, that is, during the performance of a processing step (for example, straightening, forming, joining) and/or after a processing step on a resulting intermediate product. The processing data record can also contain data calculated from measurement data measured, for example, during the processing of the flat metal product. The processing data record can also have, for example, a parameter value that was set for a processing device involved in the processing of the flat metal product during the production of the desired metal workpiece. For example, static information, such as a machine identifier of a production device involved in the production of the metal workpiece, and/or dynamic information, such as a time stamp or an identifier for an employee supervising the production of the metal workpiece, can be added to the processing data record. Such added information could be stored, for example, in a memory of a control device controlling the processing plant for producing the metal workpiece.

The producer of the flat metal product and the (further) processor, that is, the producer of the metal workpiece from the flat metal product, form two independent entities, at least with regard to the technical data record. This means that the processor is either economically related to the producer of the flat metal product (for example, different departments of the same company, two different subsidiaries or affiliated companies of the same group of companies, joint venture partners or companies that are otherwise linked to one another through joint accounting and/or organization) or can be organized independently; in any case, the processor does not have spontaneous access to the data of the technical record without having completed the step of providing the technical record. Similarly, in the case that the processor generates a processing data record during processing and transmits said data record as data feedback to the producer of the flat metal product, the producer of the flat metal product does not have spontaneous access to the data in the processing data record before said transmission.

A computer model is understood here to mean any type of prediction of the change in the physical properties of the flat metal product and/or an intermediate product made therefrom through one or more processing means. The technical data record of the flat metal product serves as the input variable. The modeling itself can be done, for example, using mathematical models in an analytical, heuristic, directly numerical or approximately numerical form. The use of neural networks is also possible, in which case the actual further processing property of the processing means (s) can be taken into account and thus the corresponding character of a respective further processing means can also be included in the modeling. At least one model value for an operating parameter is provided as an output variable used to control at least one processing means involved in the processing procedure of the flat metal product into the desired metal workpiece.

A typical processing step is forming. Thus, without limitation, the metal workpiece may be a shaped part such as an open profile or a tube. In the non-exclusive example of the production of a welded tube, a strip-shaped flat metal product is first provided, which depends on the size or the diameter of the tube to be produced as an unsplit strip or as a slit strip, which has been created as part of splitting and/or slitting an unsplit strip. In the example, the technical data record for the flat metal product has been transmitted in advance by the flat metal product producer before receipt of the flat metal product, so that, based on the processing of the technical data record by the computer model, at least one operating parameter can be provided, with which the processing means can be actuated.

The processing means used in the example include a roll profiling device, in which the strip/slit strip is formed into a tubular slotted strip. This then runs through a welding device in which the slot, that is, the two longitudinal edges of the strip, are connected in a materially bonded manner, in particular in a butt joint, and a tubular strip having a closed cross section is thus established. A further means for transversely dividing the tubular strip is arranged downstream of the welding device in order to be able to divide and prepare the tubular strip into individual tubes of finite length. If required, the flat metal product in the form of a strip or slit strip can be fed to a straightening process before roll profiling in order to be able to set a predefined flatness in the strip, and optionally before or after a trimming process to trim the longitudinal edges to be able to set a defined width and/or a defined edge profile for the welding process.

Exemplary processing steps include, in particular:
- dividing, for example, stamping, cutting, transverse dividing, longitudinal dividing;
- forming, for example, profiling, roll forming, pressing, edging (die bending), drawing, deep drawing, forging, rolling, twisting, cambering;
- heat treatment, for example, annealing, hardening, surface layer hardening, thermochemical surface hardening, tempering, bainitising, pearlitizing;
- straightening, for example, stretch bending straightening, flame straightening;
- joining, for example, form-fitting (for example, riveting, clinching), force-fitting (for example, screwing), materially bonded (for example, welding, soldering, gluing);
- surface finishing, for example, painting, coating, electroplating, galvanizing, enameling, rolling, gluing, melting, dipping, spraying, flame spraying, fluidized bed sintering;
- creating composite materials, for example, metal/plastic or metal/ceramic.

An exemplary list of possible steps involved in producing the flat metal product includes:
- melting;
- casting;
- rolling, for example, hot rolling, cold rolling;
- pickling;
- annealing;
- coating, for example, electrolytically, hot-dip galvanizing, strip coating, painting;
- skin-passing;
- creating composite materials, for example, metal/plastic or metal/ceramic;
- inspecting/repairing;
- splitting (longitudinal, transverse)/dividing/punching.

In a non-limiting example, the operating parameter can have a variable setpoint of the processing means (for example, processing speed, punching dimensions), a physical or chemical variable (for example, force, temperature, caustic concentration) acting on the respective processed intermediate product during processing and/or a desired property of the resulting intermediate product or workpiece to be realized by the processing step (for example, thickness of an electroplating layer, flexural rigidity, hardness).

According to one embodiment, the technical data record has geometric data, material-specific data and/or surface-specific data of the flat metal product. This could have the advantage that the processing of the flat metal product by the processing means can, with the aid of the operating parameter model value, be adjusted automatically and based on real data to fluctuations and special features of the dimensions, the material and/or the surface finish of the flat metal product.

The geometric data of the data record relate to the length, width, thickness and/or camber of the flat metal product and material-specific data relate to the properties of the flat metal product, for example, mechanical properties such as tensile strength, elongation, microstructure etc. Surface-specific data come into play, for example, if the flat metal product is also coated with a non-metallic and/or metallic coating, so that local variations in the composition and/or thickness of the coating can be taken into account.

According to one embodiment, the production of the flat metal product has a production step, the production step being selected from casting, hot rolling, cold rolling, pickling, annealing, surface finishing and skin-passing, the part of the technical data record recorded during the production of the flat metal product having a parameter of the production step or a measured value recorded during the production step. In this way, specific properties of the individual flat metal product resulting from the technical circumstances of casting, hot or cold rolling, pickling, annealing, surface finishing and/or skin-passing could be taken into account when performing the processing step using the model value of the operating parameter of the processing means performing the processing step on the metal flat product reflecting these specific properties through the functioning of the processing means adapted in this way to the individual properties. Naturally, the technical data record can contain one or more such parameters.

According to one embodiment, the parameter of the production step is selected from a designation of a casting process, a casting temperature, a designation of a rolling process, a rolling speed, a roll thickness, a roll roughness, a roll crown, a designation of a pickling process, an annealing temperature, an annealing time, a designation of a surface finishing process, a designation of a material used for any surface finishing, a designation of a skin-passing process and a degree of skin-passing. For example, by setting the operating parameter to the model value, the processing means could take into account the casting process, the casting temperature, the rolling process, the rolling speed, the roll thickness, the roll roughness, the roll crown, the pickling process, the annealing temperature, the annealing time, the surface finishing process, the material used for surface finishing, the skin-passing process and/or physical properties of the flat metal product (for example, rigidity, hardness, toughness, (specific) strength, ductility, brittleness, surface roughness, deviations from the nominal geometry) that are dependent in a known manner.

According to one embodiment, the technical data record has data characterizing any defect in the flat metal product. A defect is understood here as a production defect of the flat metal product, that is, a deviation of a physical or material property of the flat metal product from a nominal, standard or target condition expected at delivery. A non-exhaustive list of typical defects includes segregation, blowhole, crack, pore, void, inclusion, and coating detachment. Visible defects can be detected, for example, on the surface of the flat metal product using suitable means, such as by means of induction or imaging methods, and invisible defects within the flat metal product can be detected by suitable means, such as ultrasound. A defect can be characterized, for example, by specifying the type of defect, its position (without limitation, for example, in two coordinates if the thickness of the flat metal product is negligible, such as a sheet coil or metal foil, or for example, in three coordinates if the thickness is significant, structurally workable. for example, in a heavy plate having a thickness of 20 mm or 160 mm) and/or geometric information characterizing its size and shape (for example, circle with a circle diameter, polygon with one or more edge length(s)).

Communicating a defect with the aid of the technical data record could allow the processor to take the error into account when processing the flat metal product, for example, by not using the area where the defect is located, by adding an appropriate repair step to the processing procedure, or by processing the defect along with it, if this does not impair the function of the metal workpiece, possibly associated with, for example, a turning step that conveys the flat metal product into an orientation in which the defect is placed at an uncritical position of the desired metal workpiece after the processing procedure has been completed. The receipt of the defect characterization can optionally additionally or alternatively take place via a path separate from the transmission channel of the other data of the technical data record (for example, session-based retrieval of the data record from a remote access memory) (for example, by receiving a notification e-mail) and, for example, on an output device (for example, screen, loudspeaker) as a message.

According to one embodiment, the flat metal product has a surface finish and/or a coating. In this case, the flat metal product could have a defect that is hidden by the coating or other surface finish, so that even an incoming inspection could not find it. However, if the defect is discovered during the production of the flat metal product, technical data characterizing the defect can be detected and recorded in the technical data record, for example, in an inspection step before the application of the surface finish. Receiving a defect characterization for an invisible defect could thus provide the benefit of a more consistent metal workpiece quality. A coating can in particular be a metallic anti-corrosion coating or a non-metallic coating, for example, in the form of a foil (foil coating) or in the form of a paint (paint coating).

According to one embodiment, the metal workpiece is produced in a processing plant, the processing plant receiving the flat metal product and the technical data record from a metalworking company (for example, a press or rolling mill). This could have the advantage that, as a result of receiving the technical data record, a production control system of the processing plant gains access to the technical information contained therein characterizing the flat metal product, which would otherwise be treated as internal information of the metalworking company and could therefore not be accessed by the processing plant. Thus, by determining the model value forth operating parameter of the processing means as described herein, the processing plant could take into consideration this information when producing the metal workpiece from the flat metal product with the aid of the processing means set to the model value of the operating parameter.

An example of a processing plant is a so-called steel service center (SSC). SSCs have processing means used for the further processing of flat metal products and define interfaces to end users (further processors) for the producers of flat metal products, so that the desired target products (metal workpieces) can be provided. In this way, SSCs can get the corresponding technical data record for the flat metal product from the flat metal product producers before receipt, so that said SSCs could plan and commission accordingly, that incoming inspections and downtimes could be reduced, throughput times optimized and the planning reliability of the processing procedure could be improved in connection with numerous other processing procedures planned by the SSC. In this regard, the SSCs could also inform the end users of delivery dates more quickly and promise or keep them accordingly.

According to one embodiment, the method for producing a desired metal workpiece from a flat metal product also has recording a processing data record characterizing the processing step during the performance of the processing step on the flat metal product and transmitting the processing data record to the metalworking company for adapting a control of a production facility of the metalworking company on the basis of the processing data record. The data return set up in this way from the processing plant to the metalworking company could enable the metalworking company to adapt process parameters in the future production of further flat metal products such that certain properties of the future flat metal products are optimized for one or more of the processing steps. In this way, for example, systematic deviations in the geometry of the flat metal product from a known requirement of the processing plant could be detected and reduced or eliminated by the metalworking company, so that in the example, an additional processing step for correcting the systematic dimensional deviations (trimming) could be less complex or even eliminated.

According to one embodiment, the processing means is selected from a forming device, a dividing device, a joining device, a heat treatment device, a straightening device, a sorting device, a surface finishing device and a device for producing composite materials, the operating parameter characterizing a setting of the processing means or a physical effect of the processing means on the flat metal product. The computer model could thus directly specify the setting of one or more device parameters of the processing means (for example, a processing speed, a geometry setting, a tool selection or a force to be applied by the device) so that this would not have to be determined in an additional work step(s). Alternatively or additionally, a physical effect of the processing means on the flat metal product could be defined (for example, temperature, force at the location of the flat metal product), which could be monitored with the aid of a measuring device and translated into a device setting of the processing means by means of a control loop. In this way, the required scope of manual operating operations of the processing means could be reduced, the processing time of the flat metal product by the processing means could be shortened and/or the quality of the desired metal workpiece could be improved.

According to the invention, the flat metal product is logically subdivided into a plurality of segments, the technical data record for each of the segments comprising technical data characterizing the segment. A segment-specific selection and processing of the flat metal product could be made possible in this way. For example, the properties of the flat metal product could not be used as mean or nominal values defined over the entire length and width, but as segment-specific real values for modeling. As a result, it could be possible to react better to local fluctuations during the processing procedure, in particular when controlling the processing means.

If, for example, the flat metal product is in the form of a strip, said product has a greater longitudinal extent (length) than the transverse extent (width), it being possible in particular for the length to be subdivided into individual sections. Since the physical and/or material-specific properties can vary in the longitudinal and/or transverse extent of the flat metal product, the division into sections could contribute to a division into sections in the longitudinal extent (and/or in the transverse extent, if necessary) being more meaningful and local fluctuations easier to identify than an average value over the entire length, which does not take local fluctuations into account.

According to one embodiment, each segment can be interpreted individually, in particular depending on the technical data record. Each segment preferably has an extent of at most 5 meters (m), preferably at most 1 meter, in at least one direction. The direction could be, for example, a longitudinal direction of a strip, so that the strip is logically divided into small transverse segments, or a transverse direction of the strip, so that there is a logical division into a plurality of gap strips having individual properties. The flat metal product can also be partitioned with logical dimensional limitations in more than one direction, for example, as a 50×50 centimeter (cm) grid. Since the material-specific properties can vary in the longitudinal and/or transverse extension of the flat metal product, the division into sections could help to ensure that a fine division into sections in the longitudinal extension (and/or in the transverse extension, if necessary) of 1 m and less is more meaningful and different local fluctuations can be identified better than an average value over the entire length, which does not take local fluctuations into account.

Consideration of material fluctuations by means of high resolution in the processing procedure could enable more precise sorting, for example, according to quality, in particular in the production of small-format metal workpieces. A further advantage could be that when a plurality of metal workpieces is produced from the same flat metal product, a final quality check could be simplified since, due to the high resolution, workpiece-specific quality information from the production of the underlying flat metal product is already available.

According to one embodiment, the operating parameter has a specification of a segment selected from the segments for the production of the metal workpiece. By evaluating the technical data record and comparing said record with a specification of the desired metal workpiece provided to the input of the computer model, the computer model could identify a segment which is most suitable for the individual metal workpiece. This could enable a further improvement in quality and simplify quality monitoring, for example, in series production of the metal workpiece.

According to one embodiment, the processing means is selected from a plurality of available processing means on the basis of the technical data record and/or the model value. For example, the selection could be based on the criterion of optimizing the processing means for the individual properties of the flat metal product or reducing the wear on the processing means. Optimization could be, for example, selecting a smaller processing means for the processing step on a flat metal product having smaller (for example, significantly below average) overall dimensions, so that processing larger flat metal products on larger machines is not delayed due to a utilization of processing smaller flat metal products. Alternatively, with a large number of small-format flat metal products to be processed, the capacity utilization of the large-format machines could be increased by also processing small-format flat metal products in between. The principle can be applied analogously to other properties of flat metal products, for example, when using a forming system having a higher maximum bending force for above-average thick flat metal products or using said system to form flat metal products of a smaller thickness to improve capacity utilization.

A reduction in the wear and tear of the processing means could be achieved, for example, by selecting a processing means for the individually simulated flat metal product from a plurality of different systems, the identical operating parameters of which can each be set within an individually different permissible value range, for which the model value is not at the, for example, upper edge of the permissible value range. For example, a forming system using a medium bending force, process temperature, etc. could be operated with less wear than using a high bending force, process temperature, etc. Alternatively, operation at the lower end of a permissible value range for the operating parameter, for example, could result in qualitative disadvantages for the desired metal workpiece. For example, a bending device for heavy plate for forming a below-average thin flat metal product could require a particularly low bending force, which could only be set with a comparatively high degree of relative uncertainty. Repeated use of such could lead to an increased incidence of fluctuations in the geometry of resulting metal workpieces.

According to one embodiment, the production of the desired metal workpiece is suppressed if the model value is outside a predetermined value range or if, based on the model value and/or the technical data record, a warning is received about a violation of a predetermined quality criterion in the case of a hypothetical production of the metal workpiece from the flat metal product. A specification for a value range of the model value could result, for example, from one or more permissible or realizable value ranges of the corresponding operating parameter, which can be set using the available processing means, either directly as a parameter to be set on the respective machine or indirectly as a physical effect of the machine on the flat metal product.

A corresponding quality warning could be received, for example, by the computer model using its evaluation of the technical data record, by analysis software based on receipt of a simulation result from the output of the computer model, or by one of the processing means involved in processing, and optionally as a message or notice can be output on an output device (for example, screen, loudspeaker). A violation of a quality criterion could consist in particular in a failed plausibility check of data of the technical data record. In this way, for example, a mix-up of the flat metal product could be recognized and the processing procedure could be prevented from being carried out with the mixed-up flat metal product.

A suppression of the production is to be understood such that the processing procedure (that is, no processing step of the processing procedure) is not started if there is a quality warning or a value range has been exceeded. Suppressing the processing procedure when the value range is exceeded could, for example, prevent the processing means provided for setting the model value from being overloaded. In turn, suppressing the processing procedure when a quality warning is present could result in more consistent quality when producing multiple metal workpieces with the same processing procedure, or maintaining a minimum quality level for the desired metal workpiece.

In response to a suppressed processing procedure, the computer model could be run using the technical data record of another, more suitable flat metal product, and then the desired metal workpiece could be produced from the more suitable flat metal product. Alternatively, the operating parameter in question could be set in a suitable value range, for example, manually or based on an alternative automatic determination method (for example, regulation electronics). Alternatively, the suppressed processing could be performed using another processing means for which the value range is not exceeded or the quality criterion is not violated, or, if possible, the violating sub-step is performed on another processing means where the overrun or violation does not occur.

According to one embodiment, the flat metal product has a metal sheet, a strip or a slit strip. For these common formats of flat metal products, the method for producing a desired metal workpiece from a flat metal product could be implemented in a particularly barrier-free manner in the case of an existing industrial infrastructure of processing and transport means.

According to one embodiment, the method for producing a desired metal workpiece from a flat metal product additionally comprises:
- for each of a plurality of available flat metal products, receiving the technical data record characterizing the available flat metal product in each case, at least part of the data of the technical data record having been recorded during the production of the available flat metal product,
- selecting the flat metal product based on the technical data records, the selected flat metal product being the flat metal product used for performing the method for producing the desired metal workpiece.

In this way, a flat metal product to be used for the production of the metal workpiece could be selected in an optimized manner and thus an improvement in the quality of the metal workpiece and/or a less-wearing use of the processing means could be achieved.

According to one embodiment, the selecting comprises:
- receiving a specification data record characterizing the desired metal workpiece,
- for at least part of the technical data records, calculating a deviation metric of the technical data record from the specification data record,
- identifying the flat metal product for which the deviation metric is minimized.

This could offer the advantage of a quality-optimized selection of the flat metal product through the greatest possible match with the specification of the metal workpiece. In a non-limiting example, the specification data record could have one or more data codes, which are also contained in the technical data record, and specify a value or value range for each of these data codes (code-value data record). The specification could also specify one or more of the contained data codes to be used to calculate the deviation metric. The deviation metric could then calculate the difference between the value of the specification and the value of the technical data record for matching numeric data codes (for example, geometric dimensions, stiffness). For non-numerical data codes (for example, designation of the rolling process), a quantification could then be necessary, for example, as a factor '1' if there is matching and factor '0' if there is no matching, analogously as a zero addend if there is no agreement and normalized one addend if there is agreement, or using a table that, for example, quantifies different rolling processes according to their similarity. When using a plurality of data codes to determine the closeness to the specification of the metal workpiece, the deviation metric could aggregate the individual matches, for example, as a mathematical function (for example, as a sum of the difference amounts or difference squares or as a weighted sum with fixed weights or specified in the specification data record).

According to one embodiment, the selecting comprises:
- for each of at least part of the technical data records:
  - passing the technical data record to the input of the computer model,
  - based on the passing of the technical data record, receiving a model value for the operating parameter from the output of the computer model,
  - comparing the model value with a predetermined optimal value of the operating parameter,
- identifying the flat metal product for which the difference from the optimum is minimized.

This could offer the advantage of a flat metal product selection that minimizes the risk of wear and tear of the processing means through the best match to the optimum and/or allows for a more consistent metal workpiece quality. A reduction in wear could be achieved, for example, by the optimum value being in a middle value range within a permissible value range specified by design limits of the processing means, which middle value range is spaced apart from the maximum and minimum values of the operating parameter by an upper or lower value range. If the computer model now supplies different model values for a plurality of different flat metal products, which model values scatter around the optimum value, the upper and lower value range can be avoided by being as close as possible to the optimum value.

For example, a forming system using a medium bending force, process temperature, etc. could be operated with less wear than using a high bending force, process temperature, etc. Alternatively, operation in the lower value range for the operating parameter, for example, could result in qualitative disadvantages for the desired metal workpiece. For example, a bending device for heavy plate for forming a below-average thin flat metal product could require a particularly low bending force, which could only be set with a comparatively high degree of relative uncertainty. Repeated use of such could lead to an increased incidence of fluctuations in the geometry of resulting metal workpieces.

According to one embodiment, the method for producing a desired metal workpiece from a flat metal product additionally comprises:
- comparing the model value with a comparison value of the operating parameter, the comparison value characterizing a hypothetical use of the processing means for performing a further processing step on a further flat metal product,
- if the absolute value of the difference between the model value and the comparison value falls below a predetermined limit value, temporally grouping the processing step with the further processing step.

This could offer the advantage of sequentially performing different processing steps of the same processing means on different flat metal products (which may also be different cuttings of the same original flat metal product in the initial state) requiring similar values of the operating parameter. A temporal grouping is to be understood as meaning that there is no processing step between two processing steps grouped in the same group for which the model value deviates from the comparison value by at least the limit value. Consequently, the temporal grouping of the various processing steps corresponds to a grouping of the model values within an interval of the width of twice the limit value around the comparison value. The determination of the comparison value can be determined, for example, by statistically identifying a limit point (for example, median/percentile analysis).

In a further aspect, the invention provides a device for controlling the production of a desired metal workpiece from a flat metal product, the device comprising a first computing processor and a first memory having program instructions, the execution of the program instructions causing the device for controlling the production of a desired metal workpiece a flat metal product to perform:
- providing a computer model for producing the desired metal workpiece from the flat metal product in a processing procedure, the computer model comprising an input and an output, the processing procedure comprising a processing step on the flat metal product by a processing means, receiving a technical data record characterizing the flat metal product, at least part of the data of the technical data record having been recorded during the production of the flat metal product, passing the technical data record to the input of the computer model, based on the passing of the technical data record, receiving a model value for an operating parameter of the processing means from the output of the computer model, producing the desired metal workpiece by controlling the processing procedure, the control of the processing procedure comprising a controlling of the processing means to perform the processing step on the flat metal product using the operating parameter set to the model value, the flat metal product being logically divided into a plurality of segments, the technical data record for each of the segments comprising technical data characterizing the segment.

In a further aspect, the invention provides a computer-implemented method for controlling a production facility of a metalworking company, for example, a press or rolling mill, the method comprising:

controlling of the production facility for the production of a flat metal product, during the production of the flat metal product, recording a technical data record characterizing the flat metal product, transmitting the technical data record to a production facility of a processing plant for controlling a processing of the flat metal product in a processing procedure implemented by the production facility on the basis of the technical data record, the flat metal product being logically divided into a plurality of segments, the technical data record for each of the segments comprising technical data characterizing the segment.

This method, which is complementary to the method for producing a desired metal workpiece from a flat metal product, could result in the technical data record being made available to the processing plant as required, at a later time or together with the flat metal product, so that this could be passed to the input of the computer model and a model value derived therefrom could be set for an operating parameter in the production of the metal workpiece.

According to one embodiment, the method for controlling a production facility of a metalworking company additionally has receiving a processing data record characterizing the processing procedure based on the technical data record and adapting the control of the production facility based on the processing data record. The data return set up in this way from the processing plant to the metalworking company could enable the metalworking company to adapt process parameters in the future production of further flat metal products such that certain properties of the future flat metal products are optimized for one or more of the processing steps. For example, systematic deviations in the geometry of the edges of the flat metal product from a known requirement of the processing plant for a joining process could be identified in this way and reduced or eliminated by the metalworking company, so that, in the example, an additional processing step for correcting the systematic shape deviations (for example, trimming) could be less complex or even be omitted.

According to one embodiment, the method for controlling a production facility of a metalworking company also has receiving a plurality of further processing data records, storing the processing data record together with the further processing data records and providing the stored processing data records to an input of a pattern recognition, the adaptation of the control of the production facility taking place on the basis of a pattern recognized by an output of the pattern recognition.

Pattern recognition implementing a known method, for example, based on a support vector machine, an artificial neural network or an adaptive algorithm, could facilitate the determination of limit values, systematic and/or sporadic deviations and/or relationships in the processing data records that are only recognizable on the basis of a large amount of data. For example, the influence of the material composition, edge geometry and/or surface condition of various flat metal products on their weldability could be examined and a recognized relation in the material composition in future melting and casting processes, for the edge geometry in future splitting or trimming processes and/or for the surface condition in future rolling and/or skin-passing processes are taken into account for optimization of the welding behavior.

In a further aspect, the invention provides a device for controlling a production facility of a metalworking company, the device comprising a second computing processor and a second memory having program instructions, the execution of the program instructions causing the device for controlling a production facility of a metalworking company to perform:

controlling of the production facility for the production of a flat metal product, during the production of the flat metal product, recording a technical data record characterizing the flat metal product, transmitting the technical data record to a production facility of a processing plant for controlling a processing of the flat metal product in a processing procedure based on the technical data record, the flat metal product being logically divided into a plurality of segments, the technical data record for each of the segments comprising technical data characterizing the segment.

In a further aspect, the invention provides a computer program product having instructions executable by a computing processor for performing the method according to any one of the embodiments described herein.

The embodiments described above can be combined with one another in any way, provided these combinations are not mutually exclusive.

Those skilled in the art will understand that aspects of the present invention may be embodied as a device, method, or computer program product. Accordingly, aspects of the present invention may take the form of a hardware-only embodiment, a software-only embodiment (including firmware, in-memory software, micro-code, etc.), or an embodiment combining software and hardware aspects, all of which herein may be generically referred to as "circuit", "module" or "system". Furthermore, aspects of the present invention may take the form of a computer program product carried by one or more computer-readable media in the form of computer-executable code.

Any combination of one or more computer-readable medium(s) may be used. The computer-readable medium can be a computer-readable signal medium or a computer-readable storage medium. A "computer-readable storage medium," as used herein, comprises a tangible storage medium that can store instructions executable by a computing processor of a computing device. The computer-readable storage medium may be referred to as a computer-readable non-transitory storage medium. The computer-readable storage medium may also be referred to as a tangible computer-readable medium. In some embodiments, a computer-readable storage medium may also be capable of storing data that enables said medium to be accessed by the computing processor of the computing device. Examples of computer-readable storage media include, but are not limited to: a floppy disk, a magnetic hard drive, a solid-state hard drive, flash memory, a thumb drive, random access memory (RAM), read-only memory (ROM), an optical disk, a magneto-optical disk, and the register file of the computing processor. Examples of optical disks comprise compact disks (CD) and digital versatile disks (DVD), for example, CD-ROM, CD-RW, CD-R, DVD-ROM, DVD-RW or DVD-R disks. The term computer-readable storage medium also refers to various types of recording media capable of being retrieved by the computing device over a network or communications link. For example, data can be retrieved over a modem, over the Internet, or over a local area network. Computer-executable code executing on a computer-readable medium may be transmitted over any suitable medium, including but not limited to wireless, wired, fiber optic, RF, etc., or any suitable combination of the foregoing media.

A computer-readable signal medium may include a propagated data signal containing the computer-readable program code, for example, in a base signal (baseband) or as part of a carrier signal (carrier wave). Such a propagation signal may be in any form including, but not limited to, electromagnetic form, optical form, or any suitable combination thereof. A computer-readable signal medium may be any computer-readable medium, other than a computer-readable storage medium, which may transmit, distribute, or transport a program for use by or in connection with any instruction execution system, apparatus, or device.

"Computer memory" or "memory" is an example of a computer-readable storage medium. Computer memory is any memory that is directly accessible to a computing processor.

"Computer memory" or "data storage" is a further example of a computer-readable storage medium. Computer data storage is any non-transitory computer-readable storage medium. In some embodiments, computer memory may also be computer data storage, or vice versa.

A "computing processor" as used herein comprises an electronic component capable of executing a program or machine-executable instruction or computer-executable code. Reference to computing device comprising a "computing processor" should be interpreted to comprise possibly more than one computing processor or processing cores. For example, the computing processor may be a multi-core processor. A computing processor can also refer to a collection of computing processors within a single computer system or distributed across multiple computer systems. The term computing device or computer should also be interpreted to possibly refer to a collection or network of computing devices or computers, each comprising a computing processor or computing processors. The computer-executable code may be executed by a plurality of computing processors, which may be distributed within the same computing device or even across a plurality of computers.

Computer-executable code may comprise machine-executable instructions or a program that causes a computing processor to perform an aspect of the present invention. Computer executable code for performing operations for aspects of the present invention may be written in any combination of one or more programming languages, including an object-oriented programming language such as Java, Smalltalk, C++ or similar and traditional procedural programming languages such as the "C" programming language or similar programming languages, and compiled into machine-executable instructions. In some cases, the computer-executable code may be in high-level language or pre-compiled form and used in conjunction with an interpreter that generates the machine-executable instructions.

The computer-executable code may execute entirely on a user's computer, partially on the user's computer, as a standalone software package, partially on the user's computer and partially on a remote computer, or entirely on the remote computer or server. In the latter case, the remote computer may be connected to the user's computer through any type of network, including a local area network (LAN) or a wide area network (WAN), or the connection may be made to an external computer (for example, via the Internet using an Internet service provider).

Aspects of the present invention are described with reference to flowchart illustrations and/or block diagrams of methods, devices (systems) and computer program products according to embodiments of the invention. It is noted that each block, or portions of blocks, of the flowchart diagrams, illustrations, and/or block diagrams may be implemented by computer program instructions, which may be in the form of computer-executable code. It is further noted that combinations of blocks may be combined in different flowcharts, illustrations, and/or block diagrams unless they are mutually exclusive. Said computer program instructions may be provided to a computing processor of a general purpose computer, special purpose computer or other programmable data processing device to produce a device such that the instructions executed via the computing processor of the computer or other programmable data processing device are means for performing the block or blocks of the flowcharts and/or generate the functions/steps specified in the block diagrams.

Said computer program instructions may also be stored on a computer-readable medium that can control a computer or other programmable data processing device or other device to function in a particular way such that the instructions stored on the computer-readable medium give rise to a product of manufacture, including instructions that implement the function/step specified in the block or blocks of the flowcharts and/or block diagrams.

The computer program instructions may also be stored on a computer, other programmable data processing device, or other device to cause a series of process steps to be executed on the computer, other programmable data processing device, or other device to produce a computer-executed process such that the instructions executed on the computer or other programmable devices generate methods for implementing the functions/steps specified in the block or blocks of the flowcharts and/or block diagrams.

Specific configurations of the invention are explained in more detail below with reference to the drawings. The drawings and accompanying description of the resulting features are not to be read as limiting to the respective configurations but are only intended to illustrate one or more exemplary configurations. Furthermore, the respective features can be combined with one another and with other features disclosed herein without exceeding the spirit and scope of the invention, even if such combinations are not expressly shown or mentioned.

THE DRAWINGS SHOW IN

Figure 2:
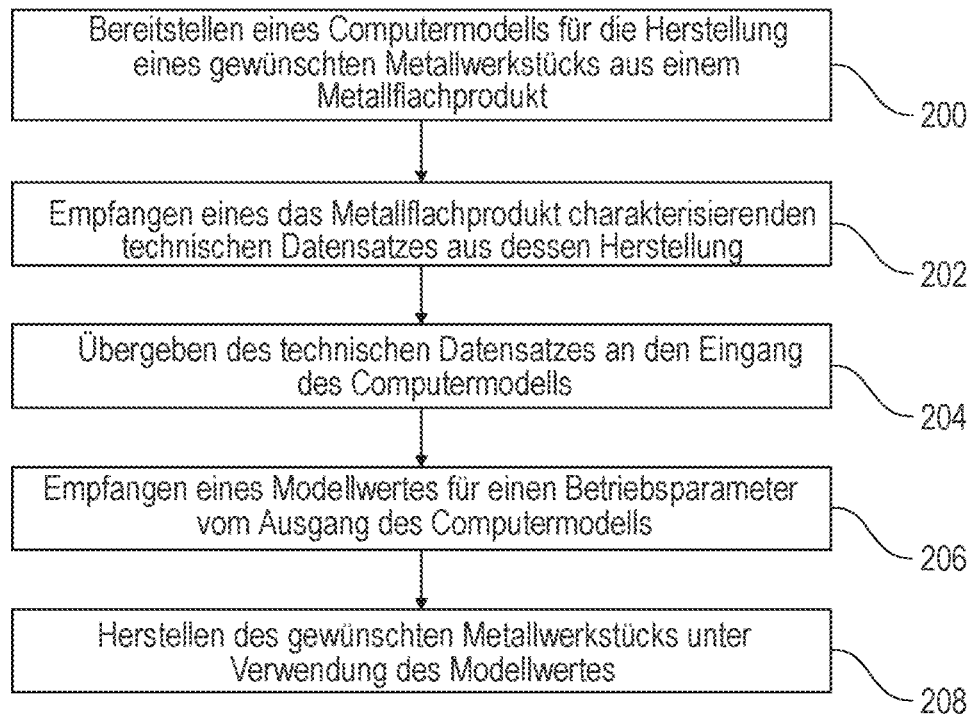
Figure 3:
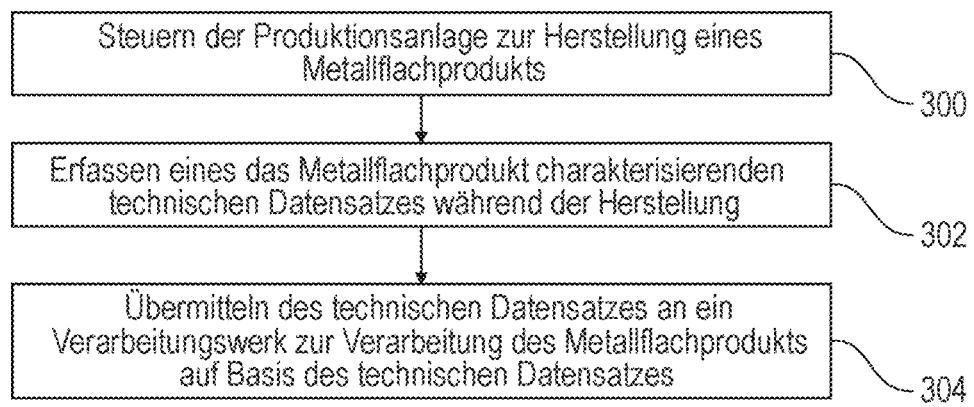

FIG. 1 a schematic representation of an environment in which the method for producing a desired metal workpiece from a flat metal product and the method for controlling a production facility of a metalworking company can be implemented;

FIG. 2 a flow chart illustrating the method of producing a desired metal workpiece from a flat metal product; and FIG. 3 a flowchart illustrating the method for controlling a production facility of a metalworking company.

FIG. 1 shows an organizational chart of a processing plant 104 connected to a metalworking company 102 (for example, a press or rolling mill) via a communication network 100 (for example, an internal network or an IP network, in particular the Internet). A control device 110 of metalworking company 102 has, for example, an interface 111 to the network 100 and, for example, a control device 160 of processing plant 104 has an interface 161 to the network 100. The control devices 110, 160 are also referred to herein as control systems 110, 160.

The metalworking company 102 uses the control system 110 for controlling the production of flat metal products in a number of production steps 130. In addition to the network interface 111, the digitally operating, programmable control system 110 also has a computing processor 112, a control interface 113 and a memory 114. The memory 114 contains program instructions 115 for performing, for example, pattern recognition and, for example, program instructions 116 for controlling production facilities (not shown) which implement the production steps 130. The production facilities are controlled, for example, via the control interface 113 (for example, a bus system or a digital control network).

The drawing shows the production steps controlled by the control system 110: slab casting 130, followed by rolling 130, followed by cooling 130, followed by pickling 130, followed by annealing 130, followed by skin-passing 130, followed by dividing 130. The steps do not all have to be performed and are only to be understood as examples. The slab casting 130 converts molten metal into a semi-finished product 140, for example, a slab 140. The production steps of cooling 130, pickling 130, annealing 130 and skin-passing 130 successively convert the slab into a series of intermediate products 142. The last step, dividing 130, converts the last intermediate product 142 into a strip, which results in the flat metal product 144, for example, a coil, after being coiled (not shown).

Various technical information is available during the production of the flat metal product 144, which information is recorded as technical data 120 by logging, for example, measured or specified parameters of the production facilities and/or measurement of measured variables that can be observed on the slab 140, the intermediate products 142 and/or the flat metal product 144. The recorded technical data 120 are transmitted, for example, via the control interface 113 to the control device 110 and optionally supplemented there with additional technical data 120 such as a time stamp and/or identifiers of the production facilities involved in the production of the flat metal product 144. The technical data 120 thus aggregated in the memory 114 of control system 110 form at least part of a technical data record 120.

The network 100 and the interfaces 111, 161 are configured such that at least one reception of the technical data record 120 by the control system 160 from the control system 110 is possible. The technical data record 120 can, for example, be transmitted from the time it was compiled by the control system 110 of the metalworking company 102 via the network 100 to the control system 160 of the processing plant 104 or can be queried by the control system 160 of the processing plant 104 from the control system 110 of the metalworking company 102.

The processing plant 104 then uses the control system 160 for controlling the processing of the flat metal product 144 in, for example, a number of processing steps 180. In addition to the network interface 161, for example, the digitally operating, programmable control system 160 also has a computing processor 162, a control interface 163 and a memory 164. The memory 164 contains, for example, program instructions 165 for executing a computer model and program instructions 166 for controlling (not shown) processing systems (herein also referred to as processing means), which implement the processing steps 180. The processing plants are controlled, for example, via the control interface 163 (for example, a bus system or a digital control network).

The drawing shows an example of the processing steps controlled by the control system 110: dividing 180, followed by straightening 180, followed by forming 182, followed by joining 180, followed by surface finishing 180, followed by heat treatment 180, followed by packaging 180. The steps do not all have to be performed and are only to be understood as examples. The processing steps dividing 180, straightening 180, forming 182, joining 180 and surface finishing 180 convert the flat metal product 144, for example, the coil, one after the other into a series of intermediate products 190. The penultimate step of heat treatment 180 transforms the final intermediate product 190 into the desired metal workpiece 192.

Before performing the processing steps 180, 182 for producing the metal workpiece 192 from the flat metal product 144, the control system 160 of the processing plant 104 executes the computer model 165, for example, and thereby transfers the received technical data record 120 or a part thereof which is considered relevant to an input of the computer model 165. The computer model 165 simulates, for example, the processing procedure 180 of the flat metal product 144 numerically and/or analytically using an implemented mathematical model. As an output, the computer model 165 provides the control system 160 with a model value, determined from the technical data record 120 received at its input, for at least one operating parameter of one of the processing plants. In the non-limiting example of the drawing, this is the forming processing step 182.

The output of the computer model 165 can also contain further specifications, for example, an indication of a processing means to be used for one of the processing steps 180, 182 on the flat metal product 144 or an intermediate product 190 formed therefrom. Alternatively or additionally, the control system 160 can allocate one or more available processing means to the individual processing steps 180, 182. After the processing means have been allocated, the control program 166 of the control system and/or the computer model 165 checks, for example, whether all the values provided for setting the operating parameters of the processing means during the production of the metal workpiece 192 are within their respective specified permissible value ranges.

If this is the case, the control program 166 then starts, for example, at a specified production time, the processing step 180, 182 for producing the metal workpiece 192. In this case, for example, the operating parameter of the forming process 182 is set to the model value output by the computer model 165, in the determination of which the technical data record 120 has been included. In this way, the forming process 182 could be controlled as a function of properties of the flat metal product 144, which properties were recorded during the production of the flat metal product 144 and were possibly only observable during the production of the flat metal product 144.

Preferably, various technical information is available during the production of the metal workpiece 192, which information is recorded as technical data 170 by logging, for example, measured or specified operating parameters of the processing plants and/or measurement of measured variables that can be observed on the flat metal product 144, the intermediate products 190 and/or the metal workpiece 192. The recorded technical data 170 are transmitted, for example, via the control interface 163 to the control device 160 and optionally supplemented therewith additional technical data 170 such as a time stamp and/or identifiers of the processing plants involved in the processing of the flat metal product 144. The technical data 170 thus aggregated in the memory 164 of the control system 160 form a processing data record 170.

In the configuration shown in the drawing, a processing data record 170 can also be received by the control system 110 of the metalworking company 102 from the control system 160 of the processing plant 104, that is, the network 100 provides, for example, bidirectional data transmission between the metalworking company 102 and the processing plant 104. From the time it is compiled, the processing data record 170 can be transmitted from the control system 160 of the processing plant 104 via the network 100 to the control system 110 of the metalworking company 102 or can be queried by the control system 110 of the metalworking company 102 from the control system 160 of the processing plant 104. The transmission of the technical data record 120 and/or the processing data record 170 via the network 100 can be cryptographically secured in order to prevent the data from being spied on by third parties.

The control system 110 can then evaluate the received processing data record 170, for example, with the aid of the pattern recognition 115 and, optionally, compare it with further processing data records received in this way as part of earlier processing orders from the processing plant 104 and stored in the memory 114 of the control system 110 in order to optimize future production of further flat metal products by adjusting the control of the production facilities with regard to one or more of the data codes contained in the processing data records.

FIG. 2 shows a flow chart for a schematic representation of a computer-implemented method for producing a desired metal workpiece 192 from a flat metal product 144. The method shown in FIG. 2 is explained here using the example of an implementation by a control device 160 of a processing plant 104.

In a step 200, the control device 160 provides a computer model 165 for producing the desired metal workpiece 192 from the flat metal product 144 in a processing step 180, 182. A processing step 182 of the processing procedure 180, 182 is carried out by a processing means, the mode of action of which on the flat metal product 144 or an intermediate product 190 formed therefrom can be controlled by an operating parameter.

In a step 202, the control device 160 receives, typically from a producer of the flat metal product 144 such as the metalworking company 102, a technical data record 120 characterizing the flat metal product 144, the data of which data record were at least partially recorded during the production of the flat metal product 144. The control system 160 transfers 204 said technical data record 120 to an input of the computer model 165.

The computing processor 162 of the control system 160 then executes the computer model 165, simulating the production process 180, 182 using a mathematical model implemented by the computer model 165. The computer model 165 contains model specifications of the processing means required for production and optimizes their mode of action by adjusting the operating parameters associated therewith.

For at least one of said operating parameters, the control device 160 receives 206 a model value from an output of the computer model 165 after the end of the simulation, to which model value the processing means implementing the processing step 182 is to be set for the optimized production of the metal workpiece 192.

During the subsequent production 208 of the desired metal workpiece 192, the control system 160, using the control program 166, for example, via the control interface 163, controls the processing means implementing the processing steps 180, 182 and sets the operating parameter of the processing means implementing the processing step 182 to the model value.

FIG. 3 shows a flowchart for the schematic representation of a computer-implemented method for controlling a production facility of a metalworking company 102. The method shown in FIG. 3 is explained here using the example of an implementation by a control device 110 of the metalworking company 102.

In a step 300, the control system 110 controls the production facility using a control program 116 stored in the memory 114 of the control system 110 and executed by a computing processor 112 of the control system 110 via the control interface 113 for the production of a flat metal product 144. Technical data of the production process (for example, measurement data and operating parameters) are recorded 302, transmitted to the control device 110 via the control interface 113, optionally supplemented by further data stored in the memory 114, such as a time stamp and/or an identifier for an employee monitoring the production and stored as a technical data record 120 in the memory 114. In a step 304, the stored technical data record 120 is transmitted to a processing plant 104 for processing the flat metal product 144 (for example, by dispatch to or collection by a control device 160 of the processing plant 104), so that the control device 160 can plan and control the subsequent processing of the flat metal product 144 taking into account the technical record 120.

LIST OF REFERENCE SYMBOLS 100 network
102 metalworking company
104 processing plant
110 control device
111 network interface
112 computing processor
113 control interface
114 memory
115 pattern recognition
116 control program
120 technical data record
130 production step
140 slab
142 intermediate product
144 flat metal product
160 control device
161 network interface
162 computing processor 163 control interface
164 memory
165 computer model
166 control program
170 processing data record
180 processing step
182 processing step
190 intermediate product
192 metal workpiece

The invention claimed is:

1. A computer-implemented method for producing a desired metal workpiece from a flat metal product, the method comprising:
   providing a computer model for producing the desired metal workpiece from the flat metal product in a processing procedure, the flat metal product being a coiled strip, the computer model comprising an input and an output, the processing procedure comprising a processing step on the flat metal product by a processing means,
   receiving a technical data record characterizing the flat metal product, at least part of the data of the technical data record having been recorded during the production of the flat metal product,
   passing the technical data record to the input of the computer model, based on the passing of the technical data record, receiving a model value for an operating parameter of the processing means from the output of the computer model, and
   producing the desired metal workpiece by controlling the processing procedure, the control of the processing procedure comprising a controlling the processing means for performing the processing step on the flat metal product using the operating parameter set to the model value,
   the flat metal product being logically divided into a plurality of segments, the technical data record for each of the segments comprising technical data characterizing the segment.

2. The method according to claim 1, wherein the technical data record comprises one or more of geometric data, material-specific data, and surface-specific data of the flat metal product.

3. The method according to claim 1, wherein the production of the flat metal product comprises a production step, wherein the production step is selected from a casting, a hot rolling, a cold rolling, a pickling, an annealing, a surface finishing and a skin-passing, wherein the part of the technical data record recorded during the production of the flat metal product comprises a parameter of the production step or a measured value recorded during the production step.

4. The method according to claim 3, wherein the parameter of the production step is selected from a designation of a casting process, a casting temperature, a designation of a rolling process, a rolling speed, a roll thickness, a roll roughness, a roll crown, a designation of a pickling process, an annealing temperature, a annealing time, a designation of a surface finishing process, a designation of a material used for any surface finishing, a designation of a skin-passing process and a degree of skin-passing.

5. The method according to claim 1, wherein one or more of the following applies:
   the technical data record comprises data characterizing any defect in the flat metal product; and
   the flat metal product comprises one or more of a surface finish and a coating.

6. The method according to claim 1, wherein the metal workpiece is produced in a processing plant, wherein the processing plant receives the flat metal product and the technical data record from a metalworking company, wherein optionally the method comprises a recording of a processing data record characterizing the processing step while the processing step is being performed on the flat metal product and a transmitting of the processing data record to the metalworking company for adapting a control of a production facility of the metalworking company based on the processing data record.

7. The method according to claim 1, wherein the processing means is selected from a forming device, a dividing device, a joining device, a heat treatment device, a straightening device, a sorting device, a surface finishing device and a device for producing composite materials, wherein the operating parameter characterizes a setting of the processing means or a physical effect of the processing means on the flat metal product.

8. The method according to claim 1, wherein one or more of the following applies:
   each segment has an extent of at most 5 meters, preferably at most 1 meter, in at least one direction; and
   the operating parameter comprises a specification of a segment selected from the segments for the production of the metal workpiece.

9. The method according to claim 1, wherein one or more of the following applies:
   the processing means is selected from a plurality of available processing means based on at least one of the technical data record and the model value; and the production of the desired metal workpiece is suppressed if the model value is outside a predetermined value range or if, based on at least one of the model value and the technical data record, a warning is received about a violation of a predetermined quality criterion in a case of a hypothetical production of the metal workpiece from the flat metal product.

10. The method according to claim 1, additionally comprising:
    for each of a plurality of available flat metal products, receiving the technical data record characterizing the available flat metal product in each case, wherein at least part of the data of the technical data record had been recorded during the production of the available flat metal product,
    selecting the flat metal product based on the technical data records, wherein the selected flat metal product is the flat metal product used in performing the method of producing the desired metal workpiece.

11. The method according to claim 10, wherein the selecting comprises:
    receiving a specification data record characterizing the desired metal workpiece,
    for at least part of the technical data records, calculating a deviation metric of the technical data record from the specification data record, and identifying the flat metal product for which the deviation metric is minimized.

12. The method according to claim 10, wherein the selecting comprises:
    for each of at least part of the technical data records:
    passing the technical data record to the input of the computer model, based on the passing of the technical data record, receiving a model value for the operating parameter from the output of the computer model, and comparing the model value with a predetermined optimal value of the operating parameter; and identifying the flat metal product for which a difference from an optimum is minimized.

13. The method according to claim 1, additionally comprising:
comparing the model value with a comparison value of the operating parameter, wherein the comparison value characterizes a hypothetical use of the processing means for performing a further processing step on a further flat metal product, and
if the absolute value of a difference between the model value and the comparison value falls below a predetermined limit value, temporally grouping the processing step with the further processing step.

14. A device for controlling a production of a desired metal workpiece from a flat metal product, the device comprising a first computing processor and a first memory having program instructions, an execution of the program instructions causing the device for controlling the production of a desired metal workpiece from a flat metal product to perform:
providing a computer model for producing the desired metal workpiece from the flat metal product in a processing procedure, the flat metal product being a coiled strip, the computer model comprising an input and an output, the processing procedure comprising a processing step on the flat metal product by a processing means,
receiving a technical data record characterizing the flat metal product, at least part of the data of the technical data record having been recorded during a production of the flat metal product,
passing the technical data record to the input of the computer model, based on the passing of the technical data record, receiving a model value for an operating parameter of the processing means from the output of the computer model, and
producing the desired metal workpiece by controlling the processing procedure, the control of the processing procedure comprising a controlling the processing means for performing the processing step on the flat metal product using the operating parameter set to the model value,
the flat metal product being logically divided into a plurality of segments, the technical data record for each of the segments comprising technical data characterizing the segment.

15. A computer-implemented method for controlling a production facility of a metalworking company, the method comprising:
controlling the production facility for the production of a flat metal product, the flat metal product being a coiled strip,
during the production of the flat metal product, recording of a technical data record characterizing the flat metal product, and
transmitting the technical data record to a production facility of a processing plant for controlling a processing of the flat metal product in a processing procedure implemented by the production facility based on the technical data record,
the flat metal product being logically divided into a plurality of segments, the technical data record for each of the segments comprising technical data characterizing the segment.

16. The method according to claim 15, additionally comprising a receiving of a processing data record characterizing the processing procedure based on the technical data record and an adapting of the controlling of the production facility based on the processing data record, wherein the method optionally additionally comprises a receiving of a plurality of further processing data records, a storing of the processing data record together with the further processing data records and a providing of the stored processing data records to an input of a pattern recognition, wherein the adaptation of the controlling of the production facility takes place based on a recognized pattern received from an output of the pattern recognition.

17. A device for controlling a production facility of a metalworking company, the device comprising a computing processor and a memory having program instructions, an execution of the program instructions causing the device for controlling a production facility of a metalworking company to perform:
controlling the production facility for the production of a flat metal product, the flat metal product being a coiled strip,
during the production of the flat metal product, recording of a technical data record characterizing the flat metal product, and
transmitting the technical data record to a production facility of a processing plant for controlling a processing of the flat metal product in a processing procedure based on the technical data record,
the flat metal product being logically divided into a plurality of segments, the technical data record for each of the segments comprising technical data characterizing the segment.

18. A computer program product having instructions, wherein the instructions are stored in a non-transitory computer-readable storage medium, executable by a computing processor for performing the method according to claim 1.

19. A computer program product having instructions, wherein the instructions are stored in a non-transitory computer-readable storage medium, executable by a computing processor for performing the method according to claim 15.

20. The method according to claim 1, wherein the technical data record for each of the segments include segment-specific real values.

* * * * *